(12) United States Patent
Falk

(10) Patent No.: US 9,602,024 B2
(45) Date of Patent: Mar. 21, 2017

(54) DC/AC CONVERTER, POWER GENERATION PLANT AND OPERATING METHOD FOR A DC/AC CONVERTER

(71) Applicant: SMA Solar Technology AG, Niestetal (DE)

(72) Inventor: Andreas Falk, Kassel (DE)

(73) Assignee: SMA SOLAR TECHNOLOGY AG, Niestetal (DE)

(*) Notice: Subject to any disclaimer, the term of this patent is extended or adjusted under 35 U.S.C. 154(b) by 546 days.

(21) Appl. No.: 14/148,928

(22) Filed: Jan. 7, 2014

(65) Prior Publication Data

US 2014/0119083 A1    May 1, 2014

Related U.S. Application Data

(63) Continuation of application No. PCT/EP2012/062091, filed on Jun. 22, 2012.

(30) Foreign Application Priority Data

Jul. 8, 2011    (DE) .................. 10 2011 107 495

(51) Int. Cl.
*H02M 7/48* (2007.01)
*H02J 3/38* (2006.01)
*H02M 3/158* (2006.01)
*H02M 7/483* (2007.01)

(52) U.S. Cl.
CPC .......... *H02M 7/48* (2013.01); *H02J 3/383* (2013.01); *H02M 3/158* (2013.01); *H02M 7/483* (2013.01); *Y02E 10/563* (2013.01); *Y10T 307/718* (2015.04)

(58) Field of Classification Search
CPC ...................................... H02M 7/48

USPC .................................. 307/43, 84; 363/123
See application file for complete search history.

(56) References Cited

U.S. PATENT DOCUMENTS

| 8,184,460 B2 | 5/2012 | O'Brien et al. |
| 2007/0035975 A1 | 2/2007 | Dickerson et al. |
| 2007/0273338 A1 | 11/2007 | West |
| 2009/0201706 A1 | 8/2009 | Zacharias et al. |

(Continued)

FOREIGN PATENT DOCUMENTS

| DE | 102006010694 A1 | 9/2007 |
| EP | 2221952 A2 | 8/2010 |

(Continued)

OTHER PUBLICATIONS

International Search Report dated Jul. 31, 2013 for International application No. PCT/EP2012/062091. 12 Pages.

*Primary Examiner* — Joseph Chang
(74) *Attorney, Agent, or Firm* — Eschweiler & Associates, LLC

(57) ABSTRACT

A DC/AC converter for converting DC power of a number of inductively connected generators into power grid conformal AC power for feeding into a connected power grid with a number of phases, includes an intermediate circuit with a positive and a negative intermediate circuit connection, and for each phase, a bridge. Each bridge includes a first switch between the positive intermediate circuit connection and a phase terminal, a second switch connected between a positive generator terminal of the generator and the phase terminal, a third switch connected between a negative generator terminal of the generator and the phase terminal, and a fourth switch between the negative intermediate circuit connection and the phase terminal.

20 Claims, 6 Drawing Sheets

(56) References Cited

U.S. PATENT DOCUMENTS

2011/0080147 A1    4/2011    Schoenlinner et al.

FOREIGN PATENT DOCUMENTS

| EP | 2256579 A1 | 12/2010 |
| JP | 2001103768 A | 4/2001 |
| JP | 2005229783 A | 8/2005 |
| JP | 2007312546 A | 11/2007 |
| JP | 2010226950 A | 10/2010 |
| JP | 2010252546 A | 11/2010 |
| JP | 2011078290 A | 4/2011 |
| JP | 2011083115 A | 4/2011 |

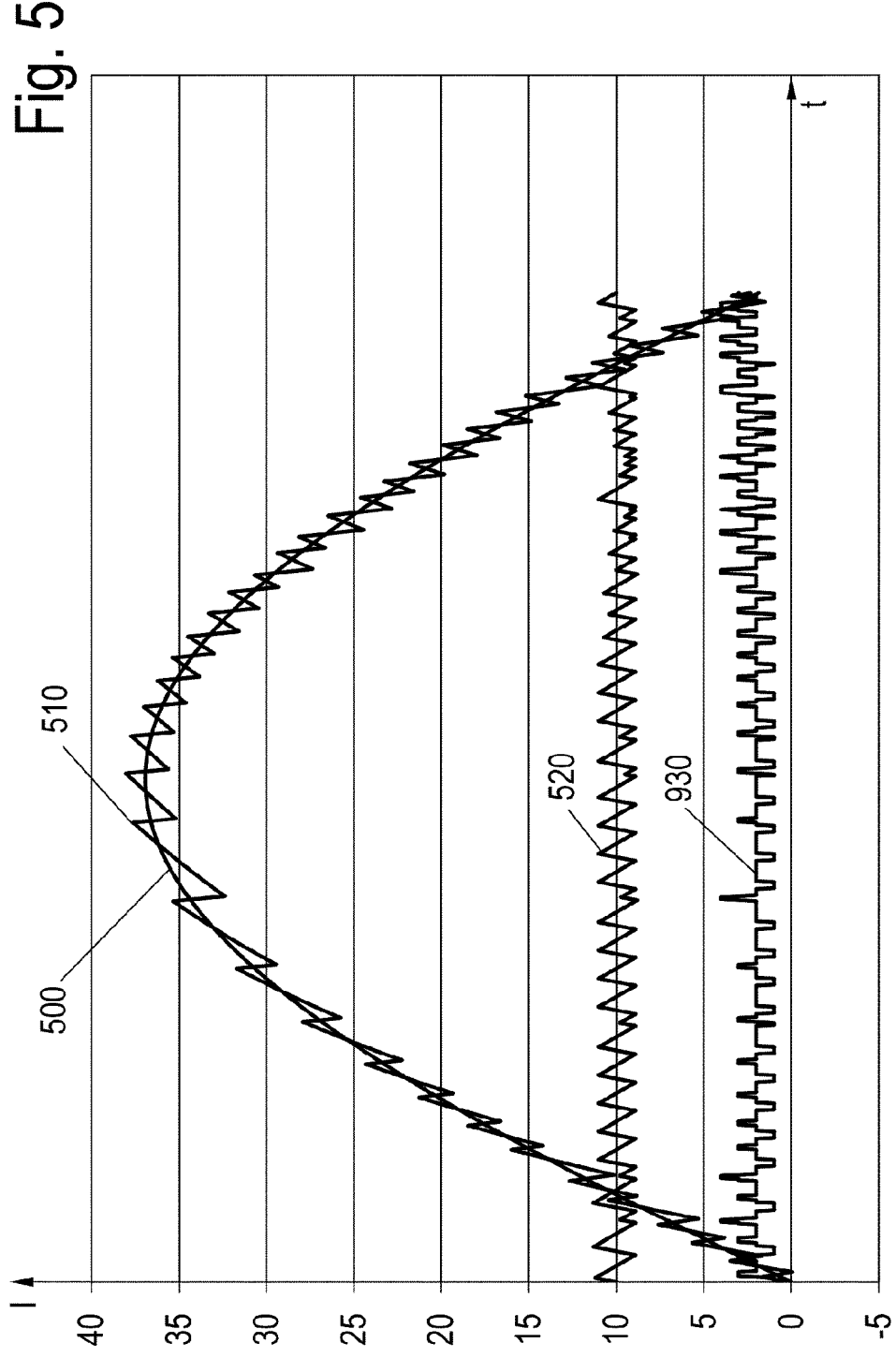

US 9,602,024 B2

DC/AC CONVERTER, POWER GENERATION PLANT AND OPERATING METHOD FOR A DC/AC CONVERTER

REFERENCE TO RELATED APPLICATIONS

This application is a continuation of International application number PCT/EP2012/062091, filed on Jun. 22, 2012, which claims priority to German application number 10 2011 107 495.7, filed on Jul. 8, 2011.

FIELD

The disclosure relates to a DC/AC converter, a power generation plant and a method for converting DC (direct current) voltage into AC (alternating current) voltage for feeding into a single-phase or multi-phase power grid.

BACKGROUND

Obtaining electrical energy from renewable sources is increasingly gaining importance. One source of renewable energy is sunlight, convertable into a DC voltage by means of photovoltaic generators (PV generators). For this purpose, a plurality of solar modules are connected in series to form so called strings that can, if appropriate, also be further connected in parallel with further strings. Here, the length of the strings determines the achievable DC voltage.

Particularly in the case of power generation plants having powers that nowadays exceed a megawatt, it is desirable to operate with high generator voltages, corresponding to large string lengths, in order to keep the currents flowing low. This reduces the outlay on connections within the plant by virtue of relatively small line cross sections. At the same time, it is desirable to select a generator voltage so that the peak values of the line voltage are exceeded.

Since a frequent requirement exists within the power generation plant to adjust the value of the generator voltage before feeding into the connected power grid, in particular to step up the generator voltage to a voltage value of an intermediate circuit, the plants frequently have a configuration in which a step-up converter, an intermediate circuit and a converter bridge are connected in series. The losses of the individual components add up in such a configuration.

SUMMARY

In one embodiment of the present disclosure a DC/AC converter is provided that can employ a relatively low number of switches to efficiently carry out a conversion of the power provided by the generator into a power grid conformal AC voltage. A method for conversion and a power plant that show the same advantages is also disclosed.

According to a first embodiment of the disclosure, a DC/AC converter for converting DC power of a number of inductively connected generators into power grid conformal AC power for feeding into a connected power grid with a number of phases, each phase being assigned to a generator is disclosed. The DC/AC converter comprises an intermediate circuit with intermediate circuit capacitor and a positive and a negative intermediate circuit connection, and for each phase of the power grid, a bridge. Each bridge comprises a first switch that forms a switchable connecting path between the positive intermediate circuit connection and a phase terminal, a second switch that forms a switchable connecting path and that is connected to a positive generator terminal of the generator assigned to the phase and the phase terminal, a third switch that forms a switchable connecting path and that is connected to a negative generator terminal of the generator assigned to the phase and the phase terminal, and a fourth switch that forms a switchable connecting path between the negative intermediate circuit connection and the phase terminal. Furthermore, the bridge comprises a first diode that connects the positive intermediate circuit connection to the positive generator terminal of the generator assigned to the phase, and a fourth diode that connects the negative intermediate circuit connection to the negative generator terminal of the generator assigned to the phase.

The switch configuration allows the generator inductors to be charged with the aid of the generator current, thus implementing a step-up converter function in such a way that the power stored in the inductors can be used to charge the intermediate circuit or to be fed into the power grid so that the intermediate circuit can be operated with an intermediate circuit voltage exceeding the generator voltage. An inverter with a step-up converter function is thus implemented with only four switches.

In advantageous embodiments of the converter, the number of the phases is one or is three.

In a further advantageous embodiment of the converter, each bridge is respectively connected to the intermediate circuit as a common intermediate circuit via the positive intermediate circuit connection and the negative intermediate circuit connection. Owing to the common intermediate circuit, a power deficit of an individual generator can be compensated, thus enabling a uniform power output via all phases. It is possible in this case to balance power between the phases in multi-phase systems, although each phase is associated with a corresponding generator.

In a further advantageous embodiment of the converter, at least one of the inductively connected generators comprises a first and a second inductance that are magnetically intercoupled, the first inductance being connected to the positive generator terminal, and the second inductance being connected to the negative generator terminal. This way, energy can be effectively stored in the inductances.

In a further advantageous embodiment of the converter, at least one of the generators is connected to one of the generator terminals via a reverse-current diode. This way, excessive compensating currents between the generators are suppressed.

In further advantageous embodiments of the converter, the switchable connecting path between the positive intermediate circuit connection and the phase terminal comprises the second switch, and a freewheeling diode is assigned to each switch of the bridge, respectively.

According to a second aspect of the disclosure, a DC/AC converter for converting DC power of a number of inductively connected generators into power grid conformal AC power for feeding into a connected power grid with a number of phases, each phase being associated to a generator of the number of generators is disclosed. The DC/AC converter comprises an intermediate circuit with intermediate circuit capacitor and a positive intermediate circuit connection and a negative intermediate circuit connection. For each phase of the power grid, a bridge is provided for switching between a plurality of switch configurations. In a first switch configuration of the bridge, the generator terminals are interconnected, and the intermediate circuit transmits a power into the power grid. In a second switch configuration of the bridge, the power of the generator is transmitted to the power grid and a difference between the power provided by the generator and a power flowing in the power grid is balanced by the intermediate circuit. Again, a step-up converter function is implemented and a power deficit of a generator can be compensated, thus enabling a uniform power output via all phases.

According to a third embodiment of the disclosure, a power generation plant comprises a DC/AC converter as described before, to which a number of generators are inductively connected. In one embodiment, at least one of the generators is connected to ground, particularly with high resistance. Further, the generator may be connected to ground via a ground current monitor. In further embodiments, each of the generators may be connected to ground, and all generators are directly interconnected at a pole, respectively. The same advantages accrue as for the first and second aspects.

According to a fourth embodiment of the disclosure, a method for converting a DC power, provided by an inductively connected generator at a positive generator terminal and a negative generator terminal, into an AC power for feeding into a power grid at a phase terminal by means of a bridge with a positive intermediate circuit connection and a negative intermediate circuit connection is disclosed. The method comprises clocked switching of the bridge between at least two configurations of switches of the bridge. In at least a first switch configuration, the generator terminals are interconnected, and the intermediate circuit transmits power into the power grid. In at least a second switch configuration, the power of the generator is transmitted to the power grid, and a difference between the power provided by the generator and a power flowing in the power grid is balanced by the intermediate circuit. The same advantages accrue as for the first and second embodiments.

In an advantageous embodiment, the method comprises clocked switching of the bridge between four configurations of the switches of the bridge. In the first configuration, the positive and the negative generator terminals are interconnected and are connected to the positive intermediate circuit connection and to the phase terminal. In the second configuration, the positive generator terminal is connected to the phase terminal and to the positive intermediate circuit connection, but is isolated from the negative generator terminal. In a third configuration, the negative generator terminal is connected to the phase terminal and to the negative intermediate circuit connection, but is isolated from the positive generator terminal. In a fourth configuration, the positive and the negative generator terminals are interconnected and are connected to the negative intermediate circuit connection and to the phase terminal.

In further advantageous embodiments of the method, the power grid comprises three phases, each phase being associated with a bridge and a generator, the clocked switching of the bridges being performed by a common control using a sine-wave delta modulation or using a space vector modulation, respectively. Both modulation schemes are suited to precisely control the switches to provide a grid conformal AC-voltage.

In a further advantageous embodiment of the method, the clocked switching between the first configuration and the second configuration is performed at intervals selected to maximize the number of switches within the bridge being activated with the associated freewheeling diode being in a conductive state. This way, switching losses are minimized and maximal efficiency of the converter is achieved.

BRIEF DESCRIPTION OF THE DRAWINGS

The disclosure is illustrated below with the aid of figures which are to be interpreted as being explanatory but not restrictive. In the drawing:

FIG. 5 shows a diagram of temporal profiles of the currents within the bridge with assigned sequence of switch configurations of the bridge.

DETAILED DESCRIPTION

Figure 1:
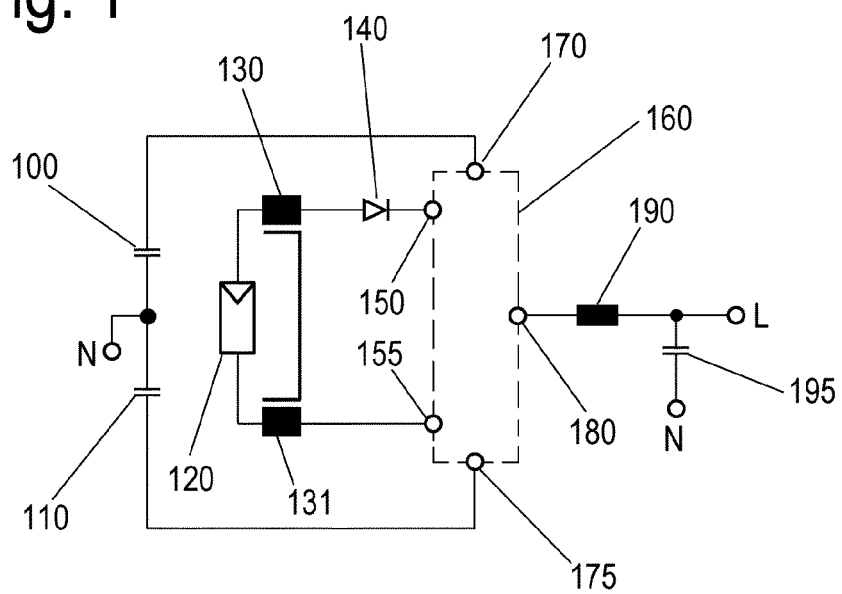
FIG. 1 shows a schematic diagram of a single-phase power generation system.

FIG. 1 shows an illustration of a power generation system that comprises a generator 120. The positive pole of the generator is connected to a positive generator terminal 150 of the bridge 160 via a generator inductor 130 and an optional reverse-current diode 140. The negative pole of the generator 120 is connected directly to a negative generator terminal 155 of the bridge 160 via a second generator inductor 131. The two generator inductors 130, 131 are magnetically intercoupled. Alternatively, it is conceivable to provide only one of the two poles of the generator 120 with a inductor, or not to intercouple the two inductors magnetically.

The power generation system further comprises an intermediate circuit that is formed here as a split intermediate circuit comprising a first intermediate circuit capacitor 100 and a second intermediate circuit capacitor 110. The midpoint between the two intermediate circuit capacitors is connected to a neutral conductor N of a connected power grid. The two end points of the intermediate circuit are connected to the bridge 160 via a positive intermediate circuit connection 170 and a negative intermediate circuit connection 175. The bridge further comprises a phase terminal 180 via which a phase L of the connected power grid is connected by means of a filter comprising a power grid inductor 190 and a filter capacitor 195.

The bridge 160 comprises a plurality of switches, and serves the purpose of interconnecting or isolating from one another in a time-regulated sequence the different connections by means of a plurality of switch configurations. In other words, the switches of the bridge provide a combination of conducting or blocking states of the switches contained in the bridge 160, doing so in such a way that the electrical DC power provided by the generator 120 is available at the phase terminal 180 as power grid conformal AC power.

Figures 2A, 2B:
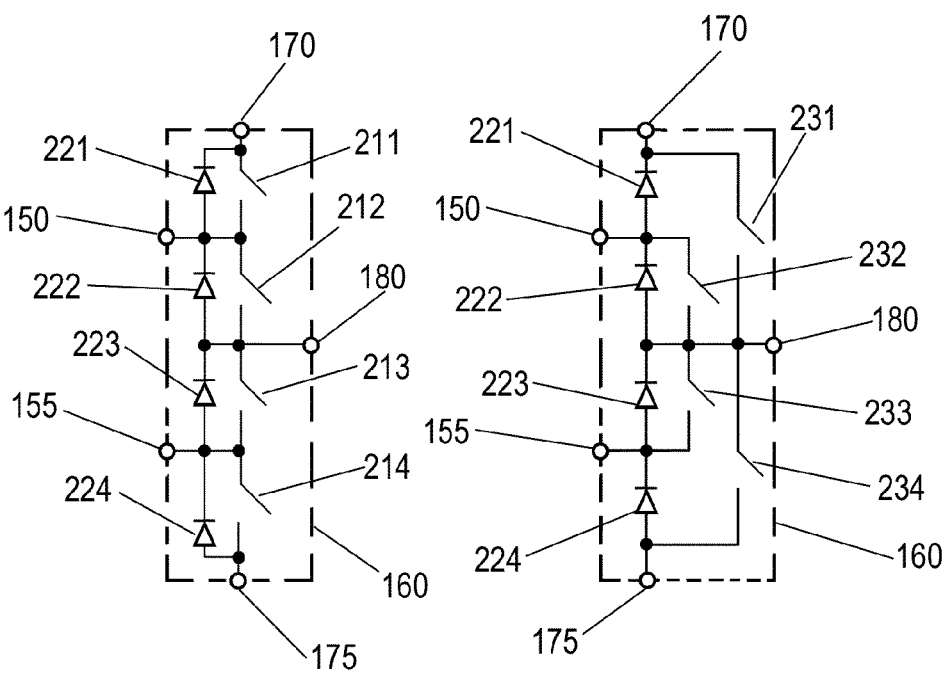
FIGS. 2a-2b show schematic diagrams of two inventive bridge configurations.

FIGS. 2a and 2b illustrate two possible arrangements of switches within the bridge 160. In a first arrangement in accordance with FIG. 2a, the bridge 160 comprises a first switch 211 that is connected at one end to the positive intermediate circuit connection 170 and, at the other end, both to the positive generator terminal 150 and to one end of a second switch 212. The other end of the second switch 212 is connected to the phase terminal 180, and to one end of a third switch 213. The third switch 213 is connected at the other end both to the negative generator terminal 155 and to one end of the fourth switch 214. The other end of the fourth switch 214 is connected to the negative intermediate circuit connection 175. The first switch 211 thus forms a switchable connecting path between the positive intermediate circuit connection 170 and the phase terminal 180, the connecting path in this case also comprising the second switch 212 as well. The same holds true for the switchable connecting path between the negative intermediate circuit connection 175 and the phase terminal 180 that leads via the third switch 213. The individual switches can be formed by any type of known semiconductor switch, in particular power semiconductor switches such as MOSFET, IGBT, JFETs, and thyristors. Each switch can in this case be assigned a freewheeling diode 221, 222, 223, 224.

FIG. 2b shows a second switch arrangement that likewise comprises four switches. Here, the first switch 231 is connected with one end to the positive intermediate circuit connection 170, and with another end to the phase terminal 180. The second switch 232 is connected to act with one end to the positive generator terminal 150 and is likewise connected with the other end to the phase terminal 180. The third switch 233 is arranged between the negative generator terminal 155 and the phase terminal 180, while the fourth switch 234 is arranged between the negative intermediate circuit connection 175 and the phase terminal 180. The second switch 232 and the third switch 233 here likewise comprise parallel freewheeling diodes 222, 223. As shown, a first freewheeling diode 221 is disposed between the positive intermediate circuit connection 170 and the positive generator terminal 150, while a fourth freewheeling diode 224 is disposed between the negative intermediate circuit connection 175 and the negative generator terminal 155. Of course, the first switch 231 and the fourth switch 234 can additionally comprise dedicated parallel freewheeling diodes (not shown).

In contrast to the arrangement of the switches from FIG. 2a, in the arrangement in accordance with FIG. 2b a power provided via the intermediate circuit connections 170, 175 can be transmitted to the phase terminal 180 via a single switch 231, 234, while in the arrangement in accordance with FIG. 2a this power flows through two switches 211, 212 or 213, 214. A corresponding minimization of the forward power losses is therefore possible.

Figure 3:
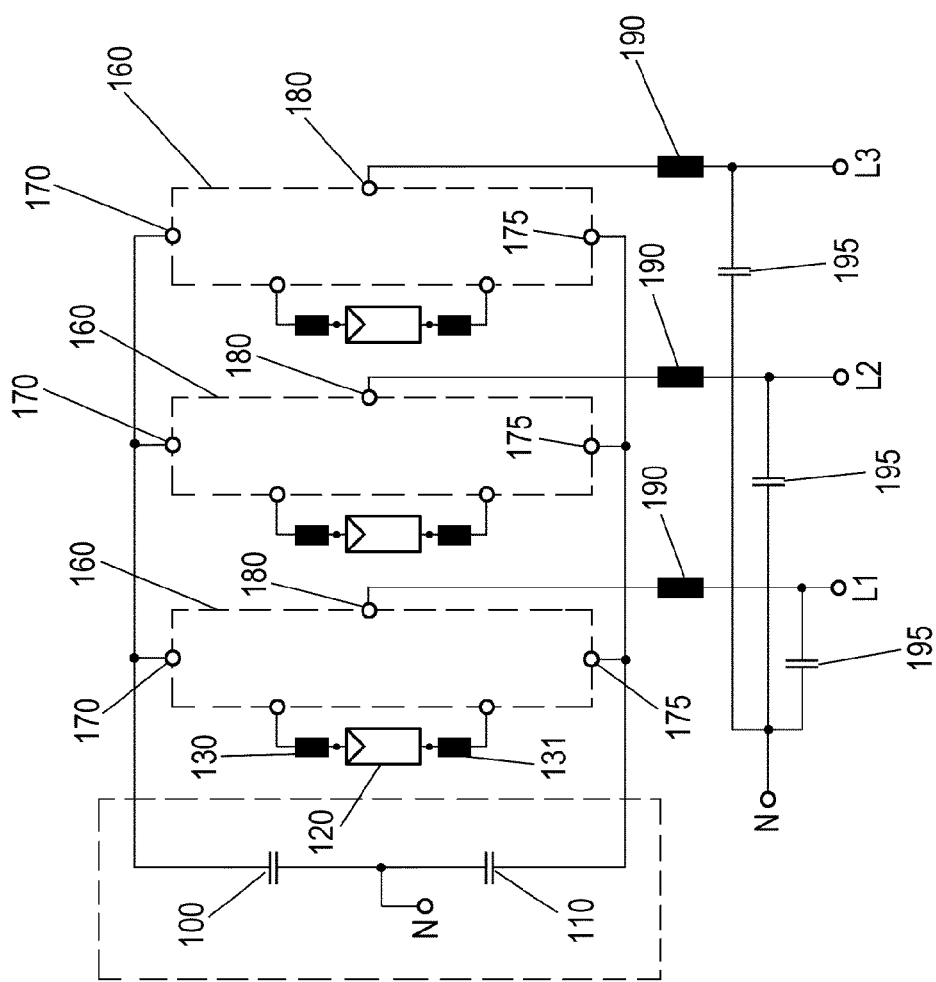
FIG. 3 shows a schematic diagram of a three-phase power generation system.

FIG. 3 shows an illustration, extended to the use with a three-phase power grid, of a power generation plant in the case of which each phase L1, L2, L3 of the power grid is respectively assigned to a bridge 160 to which in each case a corresponding generator 120 is connected inductively, that is to say via a generator inductor 130 or a pair of generator inductors 130, 131. The bridge 160 can be designed in accordance with one of the switch arrangements of FIGS. 2a-2b. All three bridges 160 are connected, both via their positive intermediate circuit connection 170 and via their negative intermediate circuit connection 175, to a common intermediate circuit that is configured here as a split intermediate circuit with two intermediate circuit capacitors 100, 110 with connection of the midpoint to the neutral conductor N. Owing to this connection, it is possible for excess power of the generators 120 to be interchanged between the individual bridges 160 and thus between the phases L1, L2, L3 of the power grid in order thus to compensate a power deficit of an individual generator 120, thus enabling a uniform power output via all three phases.

By way of example, in one variant of the disclosure it is possible for this purpose to employ four different switch configurations in temporal sequence to implement a sinusoidal current profile at the phase terminal 180. The four switch configurations are listed in Table 1 below. Here, 1 stands for a conducting state of the respective switch S1, S2, S3, S4, and 0 for a blocking state. The switches S1, S2, S3, S4 correspond to the switches 211, 212, 213, 214 or the switches 231, 232, 233, 234 in FIGS. 2a and 2b. Listed in the last two columns of the table are the sign of the change rate of the generator current $\dot{i}_{Gen}$ at one of the generator terminals 150, 155 and the sign of the change rate of the phase current $\dot{i}_{Netz}$ at the phase terminal 180.

TABLE 1

| Configuration | S1 | S2 | S3 | S4 | $\dot{i}_{Gen}$ | $\dot{i}_{Netz}$ |
|---|---|---|---|---|---|---|
| 1 | 1 | 1 | 1 | 0 | + | + |
| 2 | 1 | 1 | 0 | 0 | − | + |
| 3 | 0 | 0 | 1 | 1 | − | − |
| 4 | 0 | 1 | 1 | 1 | + | − |

The current paths in the case of the respective switch configurations in accordance with Table 1 are shown in FIGS. 4a-4d with the aid of the switch arrangement from FIG. 2a in order to illustrate the mode of operation of the bridge circuit 160. In configuration 1 of FIG. 4a, where the upper three switches S1, S2, S3 of the bridge 160 are in a conducting state, the line current at the phase terminal 180 is provided via the positive intermediate circuit connection 170, this being illustrated by section 401 of the current path. At the same time, the generator terminals 150, 155 are short circuited via the switches S2 and S3 so that an electrical circuit 402 with increasing current value is built up via the generator 120 and the generator inductors 130, 131.

Figure 4A:
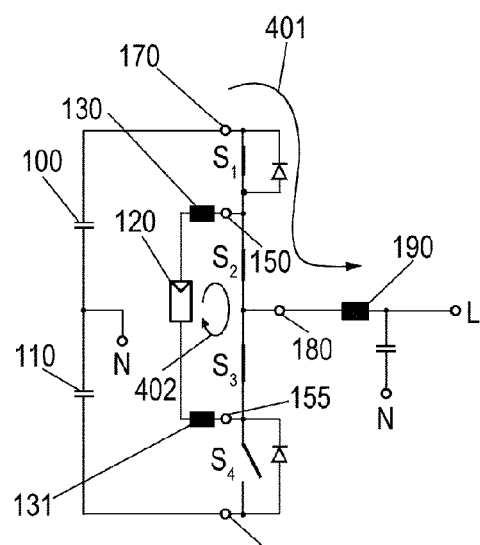
FIGS. 4a-4d show illustrations of the current paths within a bridge during a positive half wave of the phase in different switch configurations.
Figure 4B:
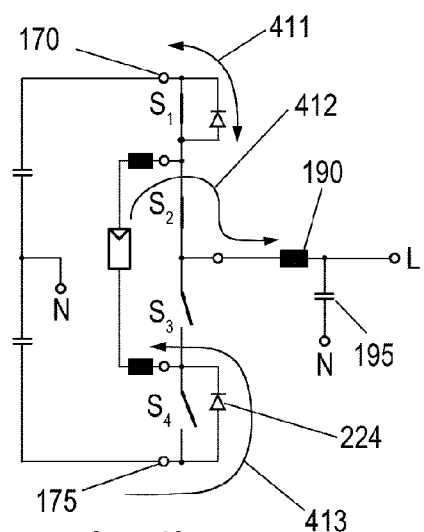

In the case of a change in the configuration 2 of FIG. 4b, where only the upper two switches S1, S2 are in a conducting state, the electrical circuit 402 is interrupted by the opening of switch S3 so that the generator current is redirected along the current path 412 into the phase terminal 180. A difference between the present generator current and the present phase current is balanced via a current flow 411 through the positive intermediate circuit connection 170 which, depending on the sign of this difference, can flow in both directions. The electrical circuit via the generator 120 is closed by a corresponding current along the current path 413 via the negative intermediate circuit connection 175 and the freewheeling diode 224.

Figure 4C:
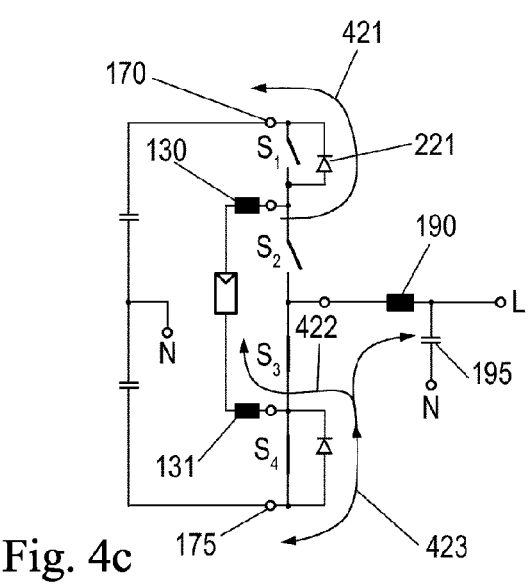

In the third configuration of FIG. 4c, corresponding to configuration 2 of FIG. 4b in a mirrored manner, the lower two switches S3, S4 of the bridge 160 are in a conducting state. Consequently, the generator current along the path 421 flows via the freewheeling diode 221 and the positive intermediate circuit connection 170 into the intermediate circuit and, from there back via the negative intermediate circuit connection 175 back into the generator along the current path 422. In addition, a current flows via the current path 423 into the phase L of the power grid so that, finally, the generator inductors 130, 131 are discharged partially into the intermediate circuit and partially into the power grid.

Figure 4D:
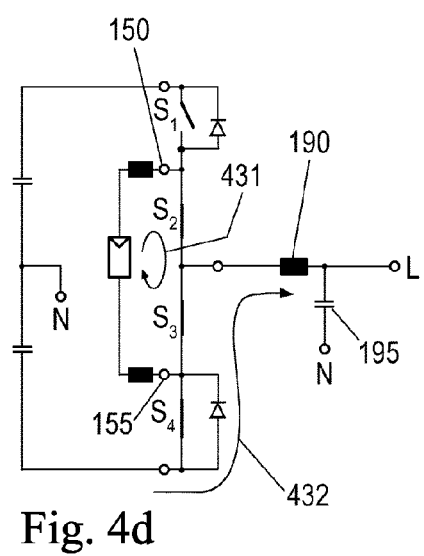

In the fourth configuration of FIG. 4d, where the lower three switches S2, S3, S4 of the bridge 160 are in a conducting state, a current is likewise built up in the generator electrical circuit 431, through the connection of the two generator terminals 150, 155, while the phase current from the intermediate circuit is maintained along the current path 432.

The configurations 1 and 4 of FIGS. 4a and 4d, where the generator inductors are charged with the aid of the generator current, implement a step-up converter function in such a way that the power stored in the inductors can be used in configurations 2 and 3 of FIGS. 4b and 4c to charge the intermediate circuit or to be fed into the power grid so that the intermediate circuit can be operated with an intermediate circuit voltage exceeding the generator voltage.

By way of example, only specific changes between configurations can be permitted in one embodiment of a sequence of configurations during operation of the inventive converter. It is thus conceivable in one embodiment to operate the bridge only in a sequence 212343212343 . . . , the dwell times in the respective configurations being varied in accordance with the control of the bridge within the period of a line half wave.

Upon changes between the configurations, it is possible also to briefly adopt other switch configurations in the bridge, for example because the instants of the change between a conducting and a blocking state of a switch can vary, and it must be ensured that no undesired short circuit of the bridge occurs during switchover. For this purpose, it is typical to use a dead time during the switchover operations in the bridge.

However, in other embodiments it is also conceivable to make deliberate use of further switch configurations in order to control the bridge. It may also be remarked that many of the switching operations inside the bridge can proceed with no loss, because the freewheeling diode assigned to the switch already carries a current at the switching instant, and so the voltage load of the switch is low at the switching instant. In order to maximize efficiency of the converter, it is therefore contemplated to change between switch configurations or to select the subsequent configuration such that the number of switches activated in a moment, in which the associated freewheeling diode is in a conductive state, is maximized.

The temporal profile of the various currents in the bridge 160 is shown in the form of a diagram in FIG. 5 as a result of a simulation. Here, the curve 510 shows the profile of the phase current in comparison with the sinusoidal target value profile 500 of the current, and the curve 520 shows the profile of the generator current. The rises and falls in the curves 510, 520 are caused by the different switch configurations of the bridge 160, which are also shown as value steps of the curve 530, and demonstrate how the bridge can simulate the target value profile 500 by suitable change between the switch configurations, the generator current assuming a profile 520 in a narrow region about a constant value, for example the current at the MPP (Maximum Power Point).

When the power generation plant is configured to feed into multi-phase power grids, in one advantageous embodiment, the bridges assigned to the individual phases are operated, particularly whenever the intermediate circuit voltage is too low by comparison with the peak voltage of the power grid, in such a manner that a sine-wave or delta modulation or a space vector modulation can be used. The potential of the neutral conductor N can thereby have a DC voltage component with respect to ground potential, and/or an AC voltage component with triple line frequency.

Figure 6:
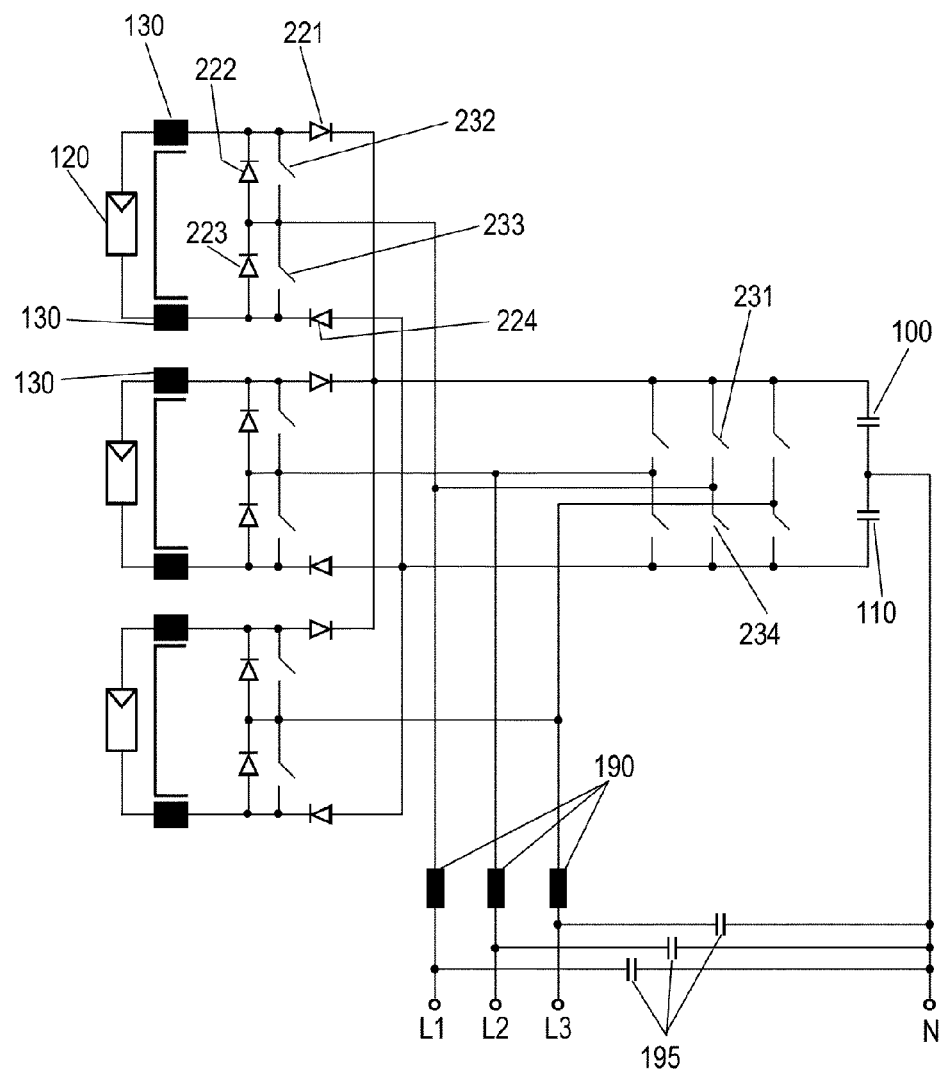
FIG. 6 shows a schematic of a three-phase power generation plant comprising a bridge in a first inventive configuration.

FIG. 6 shows a power generation plant in accordance with FIG. 3 for feeding into a three-phase power grid, the bridges 160 being formed by a switch arrangement in accordance with FIG. 2b.

Figure 7:
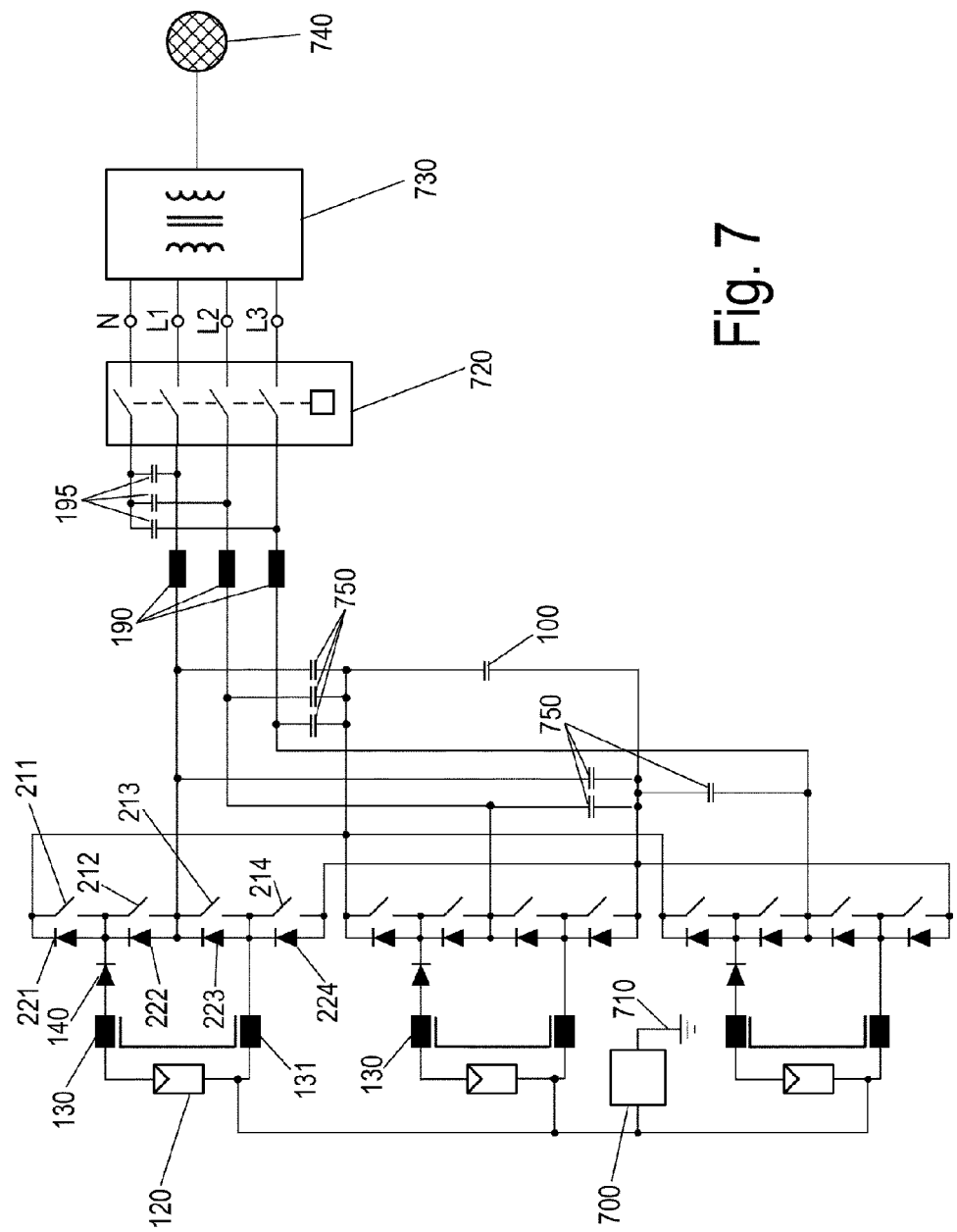
FIG. 7 shows a schematic of a three-phase power generation plant comprising a bridge in a second inventive configuration and with ground generators.

By contrast, FIG. 7 shows a power generation plant with a switch arrangement in the bridges 160 in accordance with FIG. 2a, in this case the intermediate circuit being formed only by a single capacitor 100. In order to set the mid-phase potential of the phases L1, L2, L3, the latter are respectively connected via filter capacitors 750 to the positive and negative intermediate circuit connections. The power generation plant further comprises an AC disconnector 720, for example a power grid protection, with which the bridge 160 can be connected to a transformer 730 that converts the outgoing AC voltage into a suitable voltage value of the connected power grid 740. The transformer 730 can, for example, be a medium-voltage transformer that thus enables the electrical power generated by the generators 120 to be fed directly into a medium-voltage power grid.

In addition, the power generation plant comprises a ground current monitor 700, for example a GFDI (Ground Fault Detection Interruption) that is respectively connected to a pole of each generator 120 of the power generation plant and monitors a current to a ground connection 710 and, upon a permissible current value being exceeded, institutes suitable measures, for example isolates the plant from the power grid via the AC disconnector 720. If the aim is to interconnect generators 120 assigned to different phases of the power grid, for example in order to produce an earth reference, it is recommended to use reverse-current diodes 140 in order to avoid excessive compensating currents between the generators 120.

Unlike what is shown in FIG. 7, the ground reference can also be provided only for a single or a subset of the generators 120, and can also be designed with high resistance.

The disclosure is not restricted to the embodiments described, which can be modified in many ways and supplemented by someone skilled in the art. In particular, it is possible for the features mentioned also to be designed in combinations other than those given, and to be supplemented by further previously known modes of procedure or components in order to implement the idea of the disclosure.

The invention claimed is:

1. A DC/AC converter for converting DC power of a number of inductively connected generators into power grid conformal AC power for feeding into a connected power grid with a number of phases, each phase being assigned to an associated generator, comprising:
    an intermediate circuit comprising an intermediate circuit capacitor, a positive intermediate circuit connection and a negative intermediate circuit connection, and
    a bridge for each phase of the power grid, the bridge comprising:
        a first switch configured to form a switchable first connecting path between the positive intermediate circuit connection and a corresponding phase terminal of the bridge,
        a second switch configured to form a switchable second connecting path and being connected to a positive generator terminal of the respective generator and the phase terminal, wherein the second connecting path circumvents the intermediate circuit,
        a third switch configured to form a switchable third connecting path between a negative generator terminal of the generator and the phase terminal,
        a fourth switch configured to form a switchable fourth connecting path between the negative intermediate circuit connection and the phase terminal,
        a first diode connected between the positive intermediate circuit connection and the positive generator terminal of the respective generator, and
        a last diode connected between the negative intermediate circuit connection and the negative generator terminal of the respective generator.

2. The converter as claimed in claim 1, wherein the number of the phases is one.

3. The converter as claimed in claim 1, wherein the number of the phases is three.

4. The converter as claimed in claim 3, wherein each bridge is respectively connected to the intermediate circuit that operates as a common intermediate circuit via the positive intermediate circuit connection and the negative intermediate circuit connection.

5. The converter as claimed in claim 1, wherein at least one of the inductively connected generators comprises a first inductance and a second inductance that are magnetically intercoupled, wherein the first inductance is connected to the positive generator terminal, and the second inductance is connected to the negative generator terminal.

6. The converter as claimed in claim 1, wherein at least one of the generators is connected to one of the generator terminals via a reverse-current diode.

7. The converter as claimed in claim 1, wherein the switchable connecting path between the positive intermediate circuit connection and the phase terminal comprises the second switch.

8. The converter as claimed in claim 1, wherein a freewheeling diode is assigned to each switch of the bridge.

9. A DC/AC converter for converting DC power of a number of inductively connected generators into power grid conformal AC power for feeding into a connected power grid with a number of phases, each phase being associated to a generator of the number of generators, comprising:
an intermediate circuit comprising an intermediate circuit capacitor, a positive intermediate circuit connection, and a negative intermediate circuit connection, and
for each phase of the power grid, a bridge configured to switch between a plurality of switch configurations, wherein in a first switch configuration of the bridge, the generator terminals are interconnected and form a circuit path that circumvents the intermediate circuitry, and the intermediate circuit transmits a power into the power grid, in a second switch configuration of the bridge, the power of the generator is transmitted to the power grid and a difference between the power provided by the generator and a power flowing in the power grid is balanced by the intermediate circuit.

10. A power generation plant comprising a DC/AC converter to which a number of generators are inductively connected, the DC/AC converter for converting DC power of the number of inductively connected generators into power grid conformal AC power for feeding into a connected power grid with a number of phases, each phase being associated to a generator of the number of generators, comprising:
an intermediate circuit comprising an intermediate circuit capacitor, a positive intermediate circuit connection, and a negative intermediate circuit connection, and
for each phase of the power grid, a bridge configured to switch between a plurality of switch configurations, wherein in a first switch configuration of the bridge, the generator terminals are interconnected and form a circuit path that circumvents the intermediate circuitry, and the intermediate circuit transmits a power into the power grid, in a second switch configuration of the bridge, the power of the generator is transmitted to the power grid and a difference between the power provided by the generator and a power flowing in the power grid is balanced by the intermediate circuit.

11. The power generation plant as claimed in claim 10, wherein at least one of the generators is connected to ground.

12. The power generation plant as claimed in claim 11, wherein the one of the generators is connected to ground through a high resistance.

13. The power generation plant as claimed in claim 11, wherein one or more of the generators are connected to ground via a ground current monitor.

14. The power generation plant as claimed in claim 11, wherein each of the generators is connected to ground.

15. The power generation plant as claimed in claim 11, wherein all the generators are directly interconnected at a pole.

16. A method for converting a DC power, provided by an inductively connected generator at a positive generator terminal and a negative generator terminal, into an AC power for feeding into a power grid at a phase terminal by means of a bridge with a positive intermediate circuit connection and a negative intermediate circuit connection across which an intermediate circuit resides, comprising:
clocked switching of the bridge between at least two configurations of switches of the bridge, the clocked switching further comprising:
switching in at least a first switch configuration, such that the positive and negative generator terminals are interconnected and form a circuit path that circumvents the intermediate circuitry, and the intermediate circuit transmits power into the power grid,
switching in at least a second switch configuration, such that the power of the generator is transmitted to the power grid, and a difference between the power provided by the generator and a power flowing in the power grid is balanced by the intermediate circuit.

17. The method as claimed in claim 16, further comprising clocked switching in four configurations of the switches of the bridge, wherein
in the first configuration, the positive and negative generator terminals are interconnected and are connected to the positive intermediate circuit connection and to the phase terminal, respectively,
in the second configuration, the positive generator terminal is connected to the phase terminal and to the positive intermediate circuit connection, but is isolated from the negative generator terminal,
in a third configuration, the negative generator terminal is connected to the phase terminal and to the negative intermediate circuit connection, but is isolated from the positive generator terminal, and
in a fourth configuration, the positive and negative generator terminals are interconnected and are connected to the negative intermediate circuit connection and to the phase terminal, respectively.

18. The method as claimed in claim 16, wherein the power grid comprises three phases, each phase having a bridge and a generator associated therewith, the clocked switching of the bridges being performed by a common control using a sine-wave delta modulation.

19. The method as claimed in claim 16, wherein the power grid comprises three phases, each phase having a bridge and a generator associated therewith, the clocked switching of the bridges being performed by a common control using a space vector modulation.

20. The method as claimed in claim 16, wherein the clocked switching between the first configuration and the second configuration is performed at intervals selected to maximize the number of switches within the bridge being activated with an associated freewheeling diode being in a conductive state.

* * * * *